UNITED STATES PATENT OFFICE.

STEPHEN DARBY, OF LONDON, ENGLAND.

IMPROVEMENT IN THE MANUFACTURE OF FLUID MEAT.

Specification forming part of Letters Patent No. 122,574, dated January 9, 1872.

*To all to whom it may concern:*

Be it known that I, STEPHEN DARBY, of No. 140 Leadenhall street, in the city of London, England, a subject of the Queen of Great Britain, have invented or discovered new and useful Improvements in the Manufacture of Fluid Meat; and I, the said STEPHEN DARBY, do hereby declare the nature of the said invention, and in what manner the same is to be performed, to be particularly described and ascertained in and by the following statement thereof—that is to say:

This invention has for its object improvements in the manufacture of fluid meats.

It is known that lean animal flesh, when digested with pepsin, hydrochloric (or some other) acid, and water, at a temperature of about 100° Fahrenheit, undergoes a change; the large proportion of it, which, under ordinary circumstances, is insoluble, being thus rendered capable of solution in water, and the solution so obtained by digesting meat with pepsin, hydrochloric acid, and water has been neutralized and evaporated to an extract or to a dry state. But in this process of artificial digestion, as it has been called, the preparation acquires a bitter taste, rendering it objectionable or unfit for human food. I find, however, that the admixture of a portion of pancreas or sweet-bread, or a preparation thereof, or a fluid obtained therefrom, to the liquid obtained by digestion removes the bitterness. The sweet-bread of any animal fit for human food may be employed, and, either finely minced or in other convenient form or preparation, it may be added to the liquid when it has been neutralized, either immediately after digestion or subsequently, when it has been partially evaporated. The most convenient method of procedure I find is to take lean meat, (I usually employ beef, finely sliced or minced, as for sausage making,) and digest it in water containing about one and a half per cent. of hydrochloric acid, of pharmacopœia strength, with pepsin, in the proportion of a quarter of an ounce to every pound of meat. I use two gallons of water to a pound of meat, and digest at a temperature of 100° Fahrenheit. When solution has taken place I neutralize the acid with carbonate of soda, and add, for each pound of meat employed, one ounce of finely-minced pancreas, (say of ox, cow, calf, or sheep,) and again digest at 100° Fahrenheit, until the bitterness is removed, filter, and evaporate the liquid to a convenient consistence.

The proportions and method of procedure above set forth may be varied; but

I claim as my invention—

The use of pancreas in the manufacture of fluid meat, substantially as described.

STEPHEN DARBY.

Witnesses:
G. J. WARREN,
THOS. BROWN.
*Both of No. 17 Gracechurch Street, London.*

(58)